United States Patent
Sansome

(10) Patent No.: US 7,513,551 B2
(45) Date of Patent: Apr. 7, 2009

(54) MOVABLE CLOSEOUT DEVICE FOR A CONVERTIBLE ROOF

(75) Inventor: Andrew Sansome, Ivanhoe (AU)

(73) Assignee: GM Global Technology Operations, Inc., Detroit, MI (US)

( * ) Notice: Subject to any disclaimer, the term of this patent is extended or adjusted under 35 U.S.C. 154(b) by 16 days.

(21) Appl. No.: 11/687,850

(22) Filed: Mar. 19, 2007

(65) Prior Publication Data

US 2008/0231070 A1    Sep. 25, 2008

(51) Int. Cl.
*B60J 7/20*    (2006.01)
(52) U.S. Cl. .............................. 296/24.43; 296/107.08; 296/107.07
(58) Field of Classification Search ............ 296/107.08, 296/107.05, 107.07, 24.4, 24.43, 24.44, 118, 296/37.16
See application file for complete search history.

(56) References Cited

U.S. PATENT DOCUMENTS

| | | | | |
|---|---|---|---|---|
| 5,171,054 A | * | 12/1992 | Wilson | 296/37.16 |
| 5,509,712 A | * | 4/1996 | Rausch et al. | 296/124 |
| 6,832,804 B2 | * | 12/2004 | Eichholz et al. | 296/107.08 |
| 7,125,065 B2 | * | 10/2006 | Haberl et al. | 296/107.08 |

* cited by examiner

*Primary Examiner*—Dennis H Pedder

(57) ABSTRACT

The present invention provides a movable closeout device or closeout panel for a convertible roof that attaches to the rear bow of the roof and moves up and down with the rear bow as the convertible roof retracts or extends. The closeout device may be a substantially rigid panel such as a parcel shelf, or may be a flexible or elastic panel. The movable closeout device attenuates noise entering the vehicle interior from the trunk and improves vehicle appearance by substantially closing out the area between the rear seat and the roof stowage area of the trunk when the convertible roof is in the up position.

17 Claims, 2 Drawing Sheets

MOVABLE CLOSEOUT DEVICE FOR A CONVERTIBLE ROOF

TECHNICAL FIELD

The present invention provides an acoustic barrier and visual closeout device such as a package shelf or other flexible or stiff closeout panel for a vehicle convertible roof that attaches to the rear bow and moves up and down with the rear bow as the roof retracts or extends over the passenger cabin.

BACKGROUND OF THE INVENTION

Convertible roofs are in use on a variety of motor vehicles. Convertible roofs are characterized as retractable roofs in that they are generally movable between an up position in which the roof covers the vehicle passenger compartment and a stowage position in which the convertible roof retracts from over the passenger compartment and stores or stows into a storage compartment located generally within or near the vehicle trunk. Most convertible roofs are power operated although smaller vehicles can have manually operated convertible roofs. The convertible roof is generally retracted by the activation of a switch within the driver's cockpit area, often located on the vehicle dashboard, console or windshield header. Upon actuation, a power actuator engages and drives a scissors-like linkage and support frame having a set of metal arms (also referred to as rails and links) and brackets that are joined together by pins into a complete retractable/extensible folding roof support structure. The frame folds down into itself when the convertible roof retracts. Alternately, when the roof extends, the frame unfolds, extending the convertible roof over the passenger compartment. Convertible roofs are generally either of the soft/fabric type or alternately of convertible hard top varieties.

Vehicles equipped with a convertible roof generally retract the roof directly into a portion of the vehicle trunk or into a compartment located behind the rear passenger seat, which is also usually located in a portion of the trunk. The compartment, when used, is often lined with carpet, vinyl or other materials to provide an aesthetic finished appearance and to provide a cushioned lining for the retracted convertible roof to rest upon. Vehicles that do not use the separate compartment instead generally retract the convertible roof into a portion of the vehicle trunk. These types of vehicles cover the retracted roof with either a portion of the roof, the trunk lid or with a hard tonneau cover which is sized and configured to close out or cover and fill the opening behind the rear passenger seat, specifically the opening between the vehicle trunk and the passenger compartment. In these vehicles, the hard tonneau cover or trunk lid helps to reduce noise levels in the passenger cabin by providing a barrier to attenuate noise in the trunk that otherwise would enter the vehicle passenger compartment. Tonneau covers and trunk lids are also used to improve the appearance of the vehicle by hiding the presence of the retracted convertible roof from within the passenger compartment when the convertible roof is retracted and hiding in the roof stowage tub or roof stowage compartment from being seen through the vehicle rear window or behind the rear most seat.

Vehicles with convertible roofs that stow the roof directly into a portion of the vehicle trunk generally include a partition to separate the convertible roof stowage space of the trunk from the luggage area of the trunk. Some examples of partitions in use include a soft bag, a roller blind or a rigid panel.

SUMMARY OF THE INVENTION

The present invention provides a movable closeout device for a motor vehicle convertible roof. As is typically practiced in the art, the convertible roof is adapted to permit the roof to extend to an up position where the convertible roof substantially covers the cabin or passenger compartment of the vehicle, and to retract to a stowage position where the convertible roof is stowed into a storage space within the vehicle. The convertible roof includes a rear bow that is formed in the shape of a base portion of the rear portion of the convertible roof. The rear bow is the lower bow of the convertible roof and is the rearmost bow located closest to the trunk of the vehicle when the convertible roof is extended to the up position. The rear bow extends generally outwards from the rear passenger seat towards the trunk of the vehicle. This present invention is particularly applicable to convertible vehicles in which there is an open path for noise transmission between the trunk and the passenger compartment when the convertible top is in the up position (closed over the passenger cabin). The present invention isolates the trunk from passenger compartment to prevent noise transmission and provides a visual closeout preventing the convertible top stowage area from being viewed through the rear window with the convertible roof in the up position if the vehicle design does not use a tonneau panel or deck lid to provide these functions.

In the present invention, a movable closeout device is provided and secured to the rear bow (also referred to as the rear moving bow or rear floating bow). The movable closeout device is sized so as to substantially close out the area between the rear of the passenger seat or passenger compartment partition behind the rear seat and the rear moving bow. Since in the present invention the closeout device is secured to the rear bow, the closeout device is constrained to move in unison with the rear bow as the convertible roof retracts or extends on the vehicle. The rear bow generally lowers into the storage space along with the rear roof portion of the convertible roof when the roof retracts. As discussed above, a convertible roof stowage space is generally provided in a trunk portion of the vehicle. The roof stowage space is sized and configured for receiving and storing the convertible roof when the roof is in the stowage position, which is to say when the convertible roof is open above the passenger compartment. Preferably, a movable or removable trunk panel separates the roof stowage space from the luggage space of the trunk. An interlocking device is provided for preventing the convertible roof from retracting into the storage compartment unless the trunk panel is installed in position in the trunk.

According to one aspect of the invention, the movable closeout device includes sound deadening or sound attenuating materials to attenuate the migration of noise into the vehicle cabin from the trunk.

According to another aspect of the invention, the movable closeout device improves vehicle appearance by substantially closing out the area between the rear seat and the roof stowage area of the trunk when the convertible roof is in the up position.

According to another aspect of the invention, a vehicle rear window such as a tempered glass rear window is secured to the rear roof portion of the convertible roof Additionally, the movable closeout device is sized and adapted to permit the vehicle rear window to drop onto and substantially rest against a top surface of the movable closeout device when the convertible roof is retracting into the stowage position so as to protect the vehicle rear window from damage that may occur due to materials or items stored in the trunk area.

According to another aspect of the invention, the movable closeout device is a movable parcel shelf, a substantially rigid part configured to support parcels or other objects on the shelf when the convertible roof is in the up position.

According to another aspect of the invention, the movable closeout device is a flexible panel, in some instances having rigid portions.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
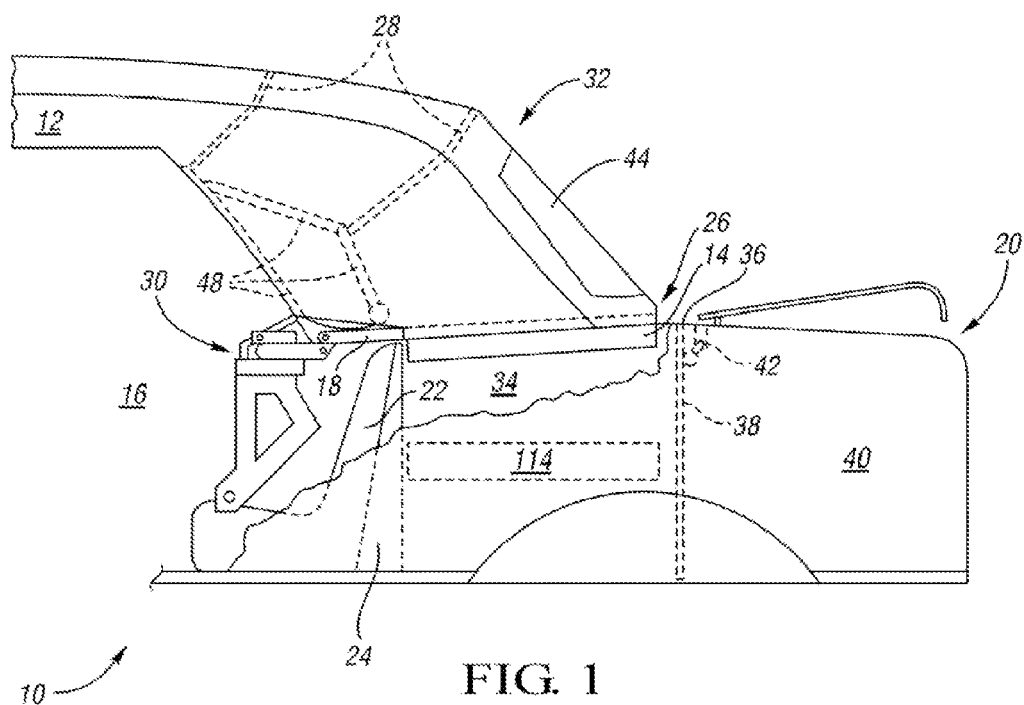
FIG. 1 illustrates a schematic cutaway side view of a rear portion of a vehicle equipped with a convertible roof and a movable closeout device consistent with the present invention.

FIG. 1 illustrates a schematic cutaway view of a rear portion of a vehicle 10 equipped with a convertible roof 12 and movable closeout device 14 consistent with the present invention. The convertible roof 12 is shown in the up position in which the convertible roof substantially covers the cabin or passenger compartment 16 of the vehicle 10. The movable closeout device 14 is secured to a portion of the length of the "U" shaped rear bow 18. The rear bow 18 is the lower bow of the convertible roof 12 and specifically is the bow located nearest to the trunk 20 of the vehicle 10 when the convertible roof 12 is extended to the up position (as shown in FIG. 1). The rear bow 18 extends generally rearwards beyond the rear passenger seat 22 towards the trunk 20 of the vehicle 10. The rear bow 18 is generally formed to conform to the desired shape of the base portion 26 of the rear portion 32 of the convertible roof 12.

A vehicle convertible roof is typically supported by a support structure having a plurality of support bows 28 which are supportively interconnected to a foldable roof frame 48. For discussion purposes only, a portion of a typical foldable roof frame 48 is shown in FIG. 1. Convertible roofs 12 and foldable roof frame 48 for retractably supporting such convertible roofs 12 are well known in the art. The foldable roof frame 48 is pivotably secured to the vehicle 10 by a pivot mechanism 30 which is configured or constrained to pivot in a manner to control retracting or extending the convertible roof 12. When the convertible roof 12 is folded back or retracted into the roof stowage compartment 34 behind the passenger seat 22, the foldable roof frame 48 and bows 28, 18 pivot as controlled by the pivot mechanism 30 to fold into the roof stowage compartment 34 below the trunk deck 36 along with the convertible roof 12.

In the present invention, a movable closeout device 14 is provided and secured to the rear bow 18. The closeout device 14 is sized to substantially close out the area between the rear of the passenger compartment partition 24 and an area defined by the "U" shaped rear bow 18. Since the closeout device 14 is secured to the rear bow 18, the closeout device 14 is constrained to move in unison with the rear bow 18 as the convertible roof 12 retracts into the storage compartment 34 or extends from the storage compartment 34 to close over the passenger compartment 16. When the convertible roof 12 is in the up/extended position (illustrated in FIG. 1) the movable closeout device 14 is in a raised position (shown by the illustrated position of the movable closeout device 14). When the convertible roof 12 is placed into the stowage position (retracted into the storage compartment 34), the movable closeout device 14 moves in unison with the rear bow 18 to a lowered position labeled 114. The configuration of the foldable roof frame 48 and operation of the convertible roof 12 including pivotal movement of the rear bow 18 are well known to those skilled in the art. As discussed above, in the present invention the closeout device 14 is secured to the rear bow 18 such that the movement of the closeout device 14 in the present invention is determined entirely by the movement of the rear bow 18. In certain embodiments, the closeout device 14 may be a stiff or substantially rigid member such as a parcel shelf, although the closeout device 14 is not limited to the use of a stiff or rigid member such as a parcel shelf. In embodiments where the closeout device 14 is a parcel shelf, the closeout device 14 is operable to support parcels or other items stowed onto the parcel shelf. In other embodiments, the closeout device 14 can include one or more flexible sheet members such as carpet or sound deadening material that improves vehicle appearance and attenuates noise from the trunk as discussed earlier. Embodiments of the closeout device 14 may include additional layers of sound attenuating material such as sound attenuating insulation material secured to the closeout device. In certain embodiments, the movable closeout device 14 is stiff in certain areas, such as the mount points, and is flexible in other areas.

The roof stowage compartment 34 is sized and configured to receive and store the convertible roof 12 when the roof is in the stowage position, which is to say when the convertible roof 12 is open over the passenger compartment 16. A movable or removable trunk panel 38 separates the roof stowage compartment 34 from a luggage compartment 40 of the trunk 20. An interlocking device 42 such as a position-sensing switch is typically provided to lock out or prevent automatic operation of the convertible roof 12 unless the trunk panel 38 is installed into its proper position in the trunk 20. The interlocking device 42 is operative to interrupt the electrical supply to or the operation of the power actuator (not shown) used to raise and lower the convertible roof 12 in instances when the trunk panel 38 is not properly installed and/or positioned. The trunk panel 38 and interlocking device 42 prevent items carried in the truck such as spare tires, tools, boxes, etc., from shifting forward into the stowage compartment 34 and interfering with the operation of the convertible roof 12 when it retracts into the stowage compartment 34.

Figure 2:
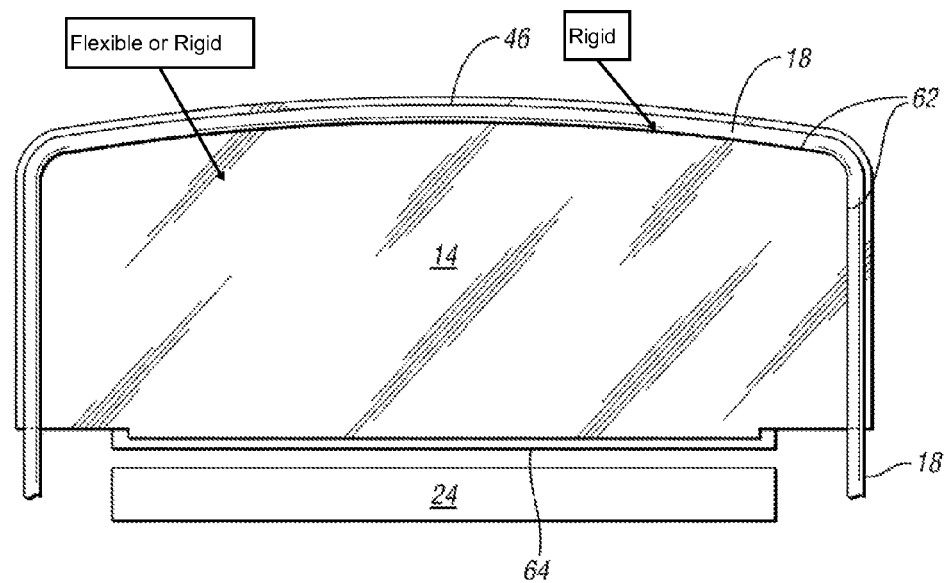
FIG. 2 illustrates a schematic top view of a movable closeout device illustrated in the roof up position (roof extended, convertible roof closed) positioned behind a passenger compartment partition consistent with the present invention.

FIG. 2 illustrates a schematic top view of the movable closeout device 14 in the raised position (convertible roof up position as illustrated in FIG. 1) positioned behind a passenger compartment partition 24. The movable closeout device 14 has a first edge portion 62 configured to conform to the shape of a rear bow 18 and a second edge portion 64 configured to abut and close out against the passenger compartment partition 24. The movable closeout device 14 is secured to the interior of the "U" shaped rear bow 18. In embodiments where the movable closeout device 14 is a flexible panel, the flexible panel may include rigid portions such as first edge portion 62 which serve as mounting points for mounting to the rear bow 18.

The exterior convertible roof fabric 46 (for discussion only, we assume the use of a fabric convertible roof) is secured onto the outwards facing portions of the rear bow 18. The present invention is not limited to the use with soft or fabric convertible roofs, but is instead applicable to the majority of convertible roof configurations including hard top convertible roofs.

Figure 3:
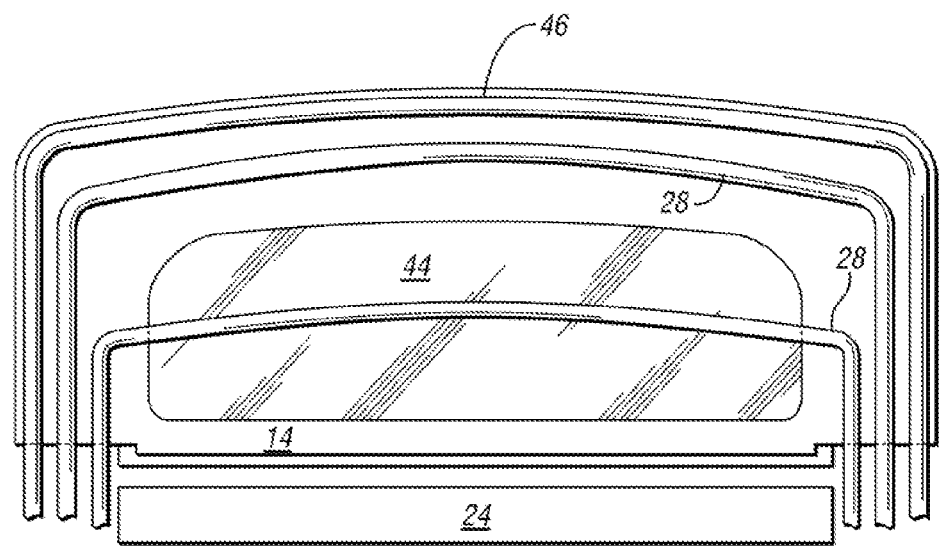
FIG. 3 illustrates a schematic top view of the movable closeout device of FIG. 2 in the stowage position (roof retracted) with some of the roof support bows and rear window protectively supported on the movable closeout device according to one aspect of the invention.

FIG. 3 illustrates a schematic top view of one particular embodiment of the movable closeout device 14 of FIG. 2 in the lowered position (convertible roof in stowage position, as shown by 114 in FIG. 1), with roof support bows 28 and rear window 44 protectively supported on the movable closeout device 14. In the illustrated embodiment, the movable closeout device 14 is a parcel shelf and the roof support bows 28 and rear window 44 lower onto portions of the parcel shelf. It is to be understood that the movable closeout device 14 is not limited to a substantially rigid parcel shelf, nor are embodiments of the movable closeout device 14 required to receive roof support bows 28 and window 44 onto the closeout device 14 when in the stowage position. The movable closeout device 14 may instead be a flexible and/or elastic panel improving the vehicle appearance and optionally including noise deadening or noise attenuation materials as discussed earlier.

In the case of a fabric convertible roof, the convertible roof fabric (not shown) folds along with the bows 28 onto the movable closeout device 14. The movable closeout device abuts the vehicle 10 at the trunk deck 36 and is positioned behind the passenger compartment partition 24.

Figure 4:
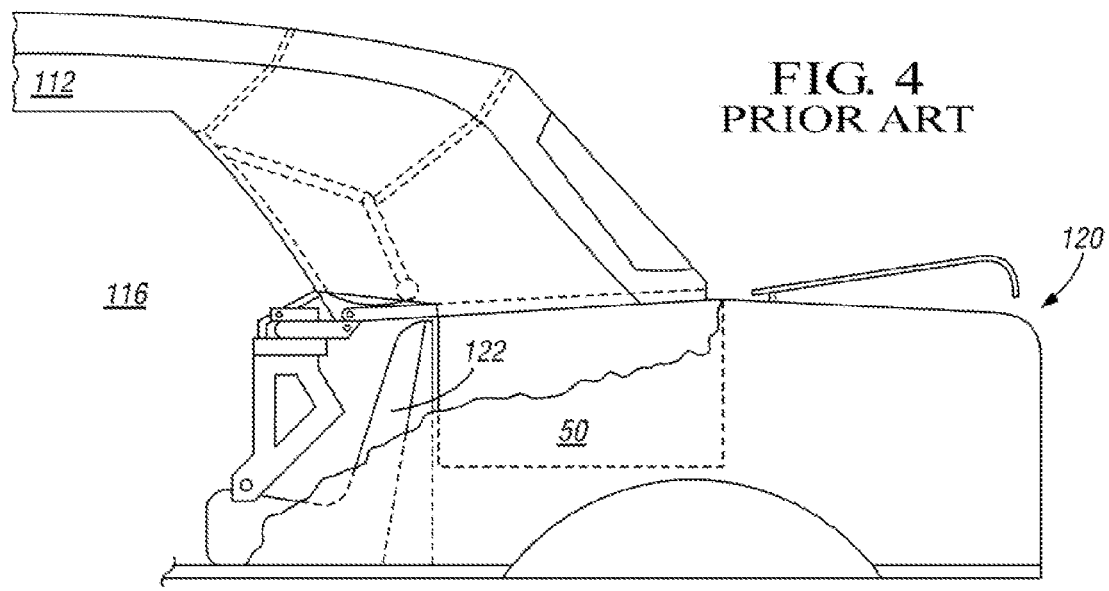
FIG. 4 illustrates a schematic cutaway view of a rear portion of a vehicle equipped with a convertible roof and the prior art roof stowage tub as discussed earlier.

FIG. 4 illustrates a prior art convertible roof configuration in which the convertible roof 112 retracts into a roof stowage tub 50 (which may be a steel tub) located behind the passenger seat 122. The roof stowage tub 50 is sized to permit the convertible roof to retract and stow into the roof stowage tub 50. The roof stowage tub 50 typically closes out the opening between the trunk 120 and the passenger compartment 116, thereby acting to attenuate noise that otherwise would enter the passenger compartment 116 from the vehicle trunk 120. As the roof stowage tub 50 remains in place when the convertible roof 112 is extended over the passenger compartment 116, the space in the trunk 120 consumed by the steel tub 50 is not available for stowing luggage or other items that may be carried in the trunk.

Now comparing FIG. 4 to FIG. 1, in the present invention (FIG. 1) the roof stowage tub 50 may advantageously be eliminated. The closeout between the trunk 20 and the passenger compartment 16 is now provided by the movable closeout device 14. As the roof stowage tub 50 (see FIG. 4) may be eliminated, trunk space is improved when the convertible roof 12 is extended over the passenger compartment 16 (indicated by the difference in height between the movable closeout device 14 in the roof up/extended position (as depicted in FIG. 1 by 14) and the position of the movable closeout device 14 in the roof stowage/retracted position (as depicted in FIG. 1 by 114). As the movable closeout device 14 closes out the opening between the trunk 20 and the passenger compartment 16, noise that otherwise would enter the passenger compartment 16 from the vehicle trunk 20 is attenuated.

Figure 5:
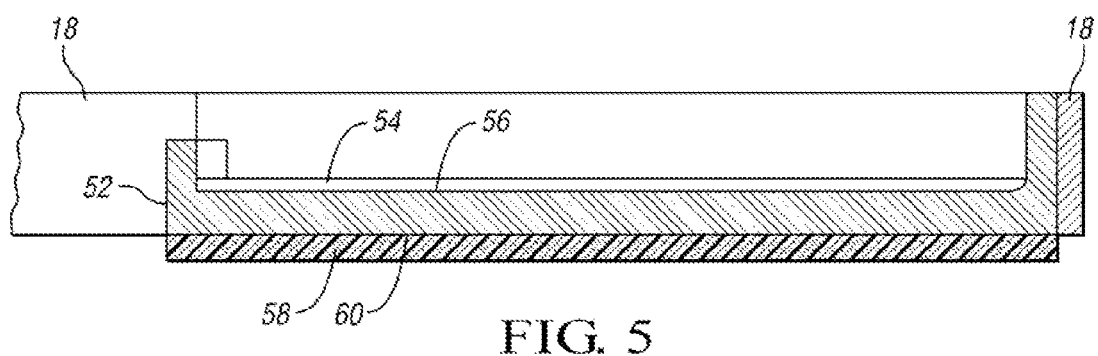
FIG. 5 illustrates a schematic sectional view of a movable closeout device consistent with the present invention.

Referring now to FIG. 5, FIG. 5 illustrates a schematic sectional view of a movable closeout device 14 (see FIG. 2) consistent with the present invention. In the illustrated embodiment, the movable closeout device 14 is a parcel shelf. The movable closeout device 14 (see FIG. 2) is secured to the rear bow 18. The movable closeout device 14 has a passenger compartment facing edge 52. The movable closeout device 14 has two major surfaces consisting of top surface 56 and bottom surface 60. The movable closeout device 14 may be provided with additional noise attenuating materials as illustrated, such as a carpet or foam backed vinyl cover 54 overlaying the top surface 56 of the movable closeout device 14. Additional noise attenuating insulation such as foam or fiberglass insulation 58 may be secured to the bottom surface 60 of the movable closeout device 14.

In the prior art, when a convertible roof retracts into the trunk and a steel tub closeout is not provided, then a hard tonneau cover is typically provided as a closeout. Before operating the convertible roof, the tonneau cover is removed. This is normally a manual procedure. The convertible roof is then raised or lowered after which the tonneau cover is then manually reattached to closeout the opening between the trunk and the passenger compartment. A benefit of the present invention is that the tonneau cover is eliminated since the movable closeout device provides the closeout.

Prior art vehicles with convertible roofs which lack the tonneau panel or deck lid as a closeout panel afford a less than desirable visual view of the retracted convertible roof through the vehicle rear window. This can be the case in vehicles that use the steel tub 50 as depicted in FIG. 4. An advantage of the present invention is that the visual appearance of the vehicle is improved by the closure provided by the movable closeout device 14 (see FIG. 1). Additionally, the movable closeout device of the present invention attenuates noise transmission into the vehicle cabin from the trunk area.

While the best modes for carrying out the invention have been described in detail, those familiar with the art to which this invention relates will recognize various alternative designs and embodiments for practicing the invention within the scope of the appended claims.

The invention claimed is:

1. A convertible roof comprising:
an extendable and retractable roof portion;
a movable rear bow secured to a base portion of said roof portion; and
a movable closeout device rigidly secured to said rear bow, wherein said movable closeout device is configured to move with said rear bow when said roof portion of said convertible roof extends or retracts;
wherein said convertible roof is secured to a vehicle;
wherein said roof portion of said convertible roof is extendable to a first up position and retractable to a second stowage position; and
wherein said convertible roof is configured to at least partially fold said roof portion onto said movable closeout device when said roof portion of said convertible roof retracts to said stowage position.

2. The convertible roof of claim 1, wherein
said vehicle includes a trunk having stowage space; and
wherein said roof portion of said convertible roof is retractable at least partially into said stowage space when said roof portion retracts;
wherein the movement of said movable closeout device provides additional stowage space in said trunk when said convertible roof portion extends.

3. The convertible roof of claim 1, wherein
said convertible roof includes a foldable roof frame;
wherein said convertible roof includes at least one roof support bow secured to said foldable roof frame, said at least one roof support bow is supporting portions of said convertible roof, and
wherein said at least one roof support bow is configured to at least partially fold onto said movable closeout device when said roof portion of said convertible roof retracts to said stowage position.

4. The convertible roof of claim 1, wherein
said vehicle includes a window; and
wherein said vehicle window is secured to said roof portion; and
wherein said movable closeout device is sized and configured to support and protect said window on a top surface of said movable closeout device when said roof portion of said convertible roof is retracted thereby protecting said vehicle window from damage.

5. The convertible roof claim 1 wherein said movable closeout device is a substantially rigid movable parcel shelf.

6. The convertible roof of claim 1 wherein said movable closeout device is a flexible panel.

7. The convertible roof of claim 6 wherein said flexible panel has rigid portions.

8. The convertible roof of claim 2 wherein said movable closeout device at least partially closes out an area between a passenger seat and said roof stowage area of said trunk when said convertible roof portion is extended in said first up position.

9. The convertible roof of claim 8 wherein said movable closeout device closes out an area between a passenger compartment partition to the rear of said passenger seat and said roof stowage area of said trunk when said convertible roof portion is in said first up position.

10. The convertible roof of claim 2 wherein noise attenuating material is secured to at least one major surface of said movable closeout device to attenuate noise entering a passenger compartment from said trunk.

11. The convertible roof of claim 10 wherein said noise attenuating material includes carpet secured to a top surface of said movable closeout device.

12. The convertible roof of claim 10 wherein said noise attenuating material includes a foam backed vinyl sheet secured to a top surface of said movable closeout device.

13. The convertible roof of claim 10 wherein said noise attenuating material is secured to a bottom surface of said movable closeout device.

14. A movable closeout device for a convertible roof comprising:
a substantially rigid panel having
a first edge portion configured to conform to the shape of a movable rear bow; and
a second edge portion configured to abut and close out against a passenger compartment partition;
wherein said first edge portion is configured to rigidly secure to said rear bow;
wherein said substantially rigid panel is sized and configured to substantially close out an area between said partition and said rear bow;
wherein said substantially rigid panel is constrained to move in unison with said rear bow; and
wherein noise attenuating material is secured to at least one major surface of said movable closeout device.

15. The convertible roof of claim 1, wherein said rear bow is generally U-shaped and at least three sides of said movable closeout device are rigidly secured to said rear bow.

16. The convertible roof of claim 15, wherein an entire length of each of said three sides of said movable closeout device are secured to said rear bow.

17. The movable closeout device of claim 14, wherein said substantially rigid panel has a first side portion and a second side portion and said rear bow is generally U-shaped, and wherein said first side portion and said second side portion are rigidly secured to said rear bow.

\* \* \* \* \*